July 13, 1943. J. L. WOODWORTH 2,324,344
CARRIER CURRENT APPARATUS
Filed Nov. 28, 1941 2 Sheets-Sheet 1

Inventor:
John L. Woodworth,
by Harry E. Dunham
His Attorney.

Patented July 13, 1943

2,324,344

UNITED STATES PATENT OFFICE 2,324,344

CARRIER CURRENT APPARATUS

John L. Woodworth, Schenectady, N. Y., assignor to General Electric Company, a corporation of New York Application November 28, 1941, Serial No. 420,851

15 Claims. (Cl. 172—239)

This invention relates to carrier current apparatus, and more particularly to such apparatus for transmitting control impulses.

It is frequently desirable to control the operation of a distant device by means of carrier current apparatus in which two consecutive impulses of carrier current are transmitted, the resulting operation of the device being determined by the interval between such consecutive impulses. It is an object of my invention to provide an improved and simplified carrier current system embodying such apparatus for transmitting and receiving two consecutive carrier current impulses to effect consequent control of a controlled device.

In the attainment of this object I provide means for transmitting two consecutive impulses of carrier current spaced apart by any desired amount, and receiving means for such impulses including a movable member for producing the desired control action and a second movable means whose motion is initiated by the first carrier current impulse. It is a further object of my invention to provide means whereby the second movable member becomes attached to the first member in response to the second carrier current impulse if the receiving apparatus is suitably adjusted to respond to the particular interval between the two impulses. It is also an object of my invention to provide improved and simplified means for making such a connection between two such movable members in response to a carrier current impulse.

It is an additional object of my invention to provide improved and simplified means for causing such second movable member to cease its motion after the apparatus has passed through a cycle of operation. It is a corollary object of my invention to provide improved and simplified means cooperating with such means for causing the first movable member to become detached from the second movable member and stop in a desired position after moving an amount sufficient to produce a desired control action.

In such apparatus I find it desirable to provide an electric motor for producing rotation of the two movable members, in response to received impulses of carrier current, and it is accordingly desirable that operation of the motor be initiated upon reception of the first carrier current impulse, that operation of the motor be continued after cessation of the first carrier current impulse, that the operation of the motor be caused to cease during reception of the second carrier current impulse, and that operation of the motor be stopped after the two movable members have completed a cycle of operation. It is accordingly another object of my invention to provide an improved and simplified control circuit for such a motor in which such operation may be readily carried out.

It is convenient to provide two switches connected with the electric motor and with a main supply, one of the switches being closed upon reception of any carrier current impulse, and the other switch being closed at all times during rotation of the two movable members and being opened only when the first movable member has been moved by the second movable member into a desired control position and the second movable member has subsequently completed its cycle of movement. It is an object of my invention to provide an improved and simplified control circuit including such an electric motor, two switches, and main supply, in which the motor is made operative by closure of either of the switches, but is made inoperative when both switches are either closed or open.

It is still another object of my invention to provide a carrier current control system including such carrier current receivers responsive to the length of the interval between two consecutive carrier current impulses as well as carrier current receivers responsive to the duration of a single carrier current impulse, the system also including means whereby suitable carrier current impulses for the different types of receivers may be readily transmitted thereto.

The features of my invention which I believe to be novel are set forth with particularity in the appended claims. My invention itself, both as to its organization and manner of operation, together with further objects and advantages thereof may best be understood by reference to the following description taken in connection with the accompanying drawing in which

Figure 1:
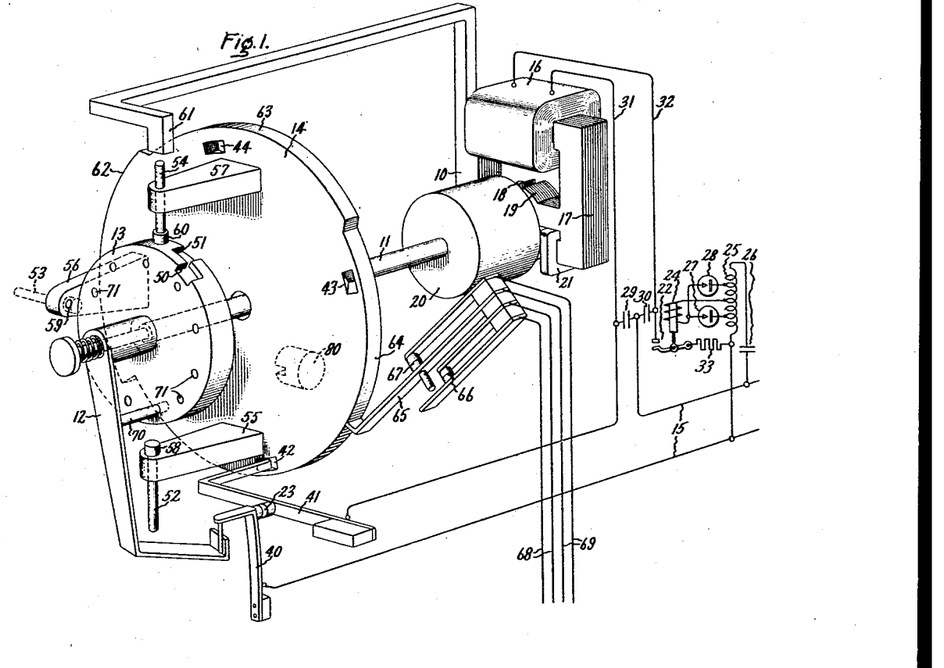
Fig. 1 illustrates schematically, and partly in perspective, a carrier current receiver embodying my invention.

In Fig. 1 a carrier current receiver includes an inductive device or electric translating means in the form of a self-starting synchronous motor 10 driving a shaft 11 in a clockwise direction at a slow speed, as for example, one revolution per minute, a switch arm 12 keyed to the shaft 11, an operating disc 13 and a cam 14 loosely journaled on the shaft 11. The motor 10 is energized in a manner to be described later from a main supply 15 of alternating potential.

It is preferred that the self-starting synchronous motor 10 be of the form described and claimed in U. S. Letters Patent 1,768,386, issued on June 24, 1930, to Henry E. Warren, entitled Motor rotor, and assigned to the Warren Telechron Company. Briefly, this motor includes an armature coil 16 to which potential from the main conductors 15 is supplied when it is desired that the motor operate. The armature coil 16 produces alternating magnetic flux in a yoke piece 17. The yoke piece 17 includes opposed pole pieces 18 and 19 which embrace a suitably journaled rotor, which is connected through suitable gears in a gear case 20 to drive the shaft 11. Each of the pole pieces 18 and 19 is divided into two portions and one portion of each pole piece is surrounded by a loop of conducting material. The loop 21 surrounding a portion of the pole piece 19 may be seen. The loop surrounding a portion of each pole piece acts to delay the transfer of magnetic flux through the corresponding portion of the pole piece, and produce a rotating magnetic field around the enclosed rotor, which thereupon turns and drives the shaft 11 through the gears in the gear case 20. There are two switches 22 and 23 connected with the motor 10, and the circuit connections are so arranged that closure of either switch 22 or 23 is effective to produce operation of the motor 10 while such operation is not produced if both switches are either open or closed. The switch 22 is electromagnetically operated by a coil and plunger 24 to closed position whenever carrier current impulses are present on the main conductors 15. To accomplish this an inductance 25 and condenser 26 are serially connected between the conductors 15 and are made resonant at the frequency of the carrier current impulses. A pair of rectifiers 27 and 28 are connected to rectify both half waves of the alternating carrier current potentials appearing across the inductance 25 and to transmit the resulting rectified current through the coil 24 of the switch 22 to close the switch.

Closure of the switch 22 is effective to produce operation of the motor 10 by reason of connections including two condensers 29 and 30 which are connected in series between the two conductors 31 and 32 leading to the armature 16 of the motor 10. One of the main conductors 15 is connected to a point between the condensers 29 and 30, while the other main conductor 15 is connected through a resistance 33, and through switch 22 to conductor 32. The size of condenser 29, as well as the size of condenser 30 for reasons to be explained later, are made of proper value to resonate at the frequency of power current flowing in the main conductors 15 with the inductance of the armature coil 16 of motor 10. Upon closure of the switch 22, the power voltage between the main conductors 15 is impressed across the condenser 30, and therefore across the condenser 29 and armature coil 16 in series. Since the condenser 29 and the inductance of coil 16 are resonant at the frequency of power current between the conductors 15, a voltage tends to appear across the inductance 16 which is higher than the voltage between conductors 15. The armature coil 16 must be suitably designed to operate the motor 10 when such high voltage is impressed on it.

In a particular case where the frequency of the power current on the conductor 15 was 60 cycles per second, and the voltage was 115, a motor 10 as described in the above mentioned patent was utilized in which the armature coil 16 had an inductance of about 17½ henrys and each of the condensers 29 and 30 was about .4 of a microfarad. The armature coil 16 had an effective resistance of about 3300 ohms and about 230 volts appeared across the armature coil 16 when the switch 22 was closed.

The switch 23 is connected between the conductor 31 and that one of the main conductors to which the switch 22 is connected through resistance 33. When the switch 22 is open, closure of the switch 23 connects the condenser 29 between the conductors 15, and thus applies the main voltage across the condenser 30 and the armature coil 16 in series. Since the condenser 30 resonates with the coil 16, just as the condenser 29 resonates with it, the coil 16 is energized to operate the motor 10 upon closure of the switch 23, just as it is upon closure of the switch 22.

If both switches 23 and 22 are closed, both conductors 31 and 32 are connected to the same one of the main conductors 15, so that the armature coil 16 is effectively short circuited. The resistance 33 is of such low value that it does not prevent this short circuiting. The purpose of the resistance 33 is to protect the contacts of the switch 22 from destructive arcing which may occur when the switch 22 closes while the switch 23 is closed. The contacts of the switch 23 may be made large and rugged enough to stand such arcing, but the contacts of the switch 22 must be made light in order to respond readily to carrier current impulses. In the particular case described above, in which the condensers 29 and 30 each had a value of .4 microfarads and the armature coil 16 had an inductance of about 17½ henrys, and a resistance of about 3300 ohms, it was found that the resistance 33 performed satisfactorily in protecting the contacts of the switch 22 when it had a value of about 150 ohms.

Operation of the motor 10 is therefore caused whenever an impulse of carrier current appears across the main conductors 15, provided the switch 23 is opened and is caused whenever the switch 23 is closed, provided no carrier current impulse is on the main conductors 15. The motor 10 does not operate when the switch 23 is open and no carrier current impulse is on the conductors 15, nor does it operate when the switch 23 is closed and a carrier current impulse is on the conductors 15.

Both contacts of switch 23 are movable. One of the contacts of the switch 23 is carried on one end of a resilient arm 40 whose other end is fixed to a rigid support. The other contact of the switch 23 is carried upon a movable portion of a resilient arm 41, of which one end is fastened to a rigid support. The outer end of the rotating arm 12 is adapted to cooperate with the movable end of the resilient member 40 so as to separate the contacts of the switch 23 whenever the arm 12 is in a particular position. There are three notches 42, 43 and 44 on the face of the cam 14 so arranged that the free end of the resilient member 41 can move to separate the contacts of the switch 23 whenever any one of these notches is in a particular position. The relation between the arm 12, the resilient members 40 and 41, the contacts of the switch 23, and the notches 42, 43 and 44 in the cam 14 are such, however, that the contacts of the switch 23 cannot be separated except when the free end of the movable member 41 has moved into one of the notches 42, 43 or 44 and simultaneously the arm 12 holds the free end of the movable member 40 away from the movable member 41. In other words, if the arm 12 is out of engagement with the movable member 40, motion of the movable member 41 is insufficient to separate the contacts of the switch 23. Similarly, if the free end of the movable member 41 is not in one of the notches 42, 43 or 44, movement of the movable member 40 induced by the arm 12 is insufficient to separate the contacts of the switch 23.

Since the arm 12 is keyed to the shaft 11, as explained previously, it turns with the shaft 11, and acts to stop the motor 10, shaft 11, and arm 12 in a predetermined position, provided no carrier current impulse on the conductors 15 closes the switch 22 while the switch 23 is closed, so as to stop the motor 10 before the arm 12 reaches the movable member 40. As explained above, the free end of the movable member 41 must be in one of the notches 42, 43 or 44 in order that the arm 12 may lift the movable member 40 to cause the contacts of the switch 23 to open and stop the motor 10 in such predetermined positions.

Means are provided whereby a driving connection is established between the rotating disc member 13 and the cam 14 whenever the free end of the movable member 41 is not in one of the notches 42, 43 or 44. This driving means includes a pair of axially displaced shoulders 50 and 51 formed by notches in the periphery of the rotatable disc member 13, which shoulders cooperate with pins 52, 53 and 54 which are slidably journaled in respective projections 55, 56 and 57 on the face of the cam 14. Each of these pins 52, 53 and 54 is provided with an enlarged head 58, 59 and 60 at the end toward the shaft 11 so that it cannot move through the corresponding projections 55, 56 or 57 radially away from the shaft and thereby fall free from the cam 14. Each of the pins 52, 53 and 54 is, however, free to slide inwardly so that its inner end bears against the rotatable disc member 13 and so that its enlarged end 58, 59 or 60 can bear against a corresponding shoulder 50 or 51 of the member 13 to provide a driving connection between the member 13 and the cam 14, if the pin is in a position to fall in the corresponding notch.

The projection 55 from the cam 14 is longer than the projection 56 and 57, so that the pin 52 bears against the shoulder 50 of the member 13, while either of the pins 53 or 54 bears against the shoulder 51 thereof.

The pins 52, 53 and 54 are formed of magnetic material, and cooperate with a projection 61 from the magnetic core 17 of the motor 10. This projection 61 ends just above one of the pins 52, 53 or 54 whenever such pin is near its topmost position. For example, as shown in Fig. 1, the end 60 of the pin 54, which is in the topmost position, bears against the periphery of the rotating disc member 13, and forms an air gap between its outer end and the projection 61. This air gap is sufficiently small, so that when the motor 10 is in operation, caused by closure either of switch 22 or 23, a portion of the magnetic flux in the core 17 attracts the pin 54 to the projection 61, thereby causing it to move upward and to be held against the projection 61. The air gap is, however, sufficient so that if the end 60 of the pin 54 were within the notch forming the shoulder 51 of the member 13, the gap would be so large that the magnetic flux from the projection 61 could not lift the pin 54.

The cam 14 is formed with a periphery divided into three portions of different radius. A first portion 62 is of the greatest radius, a second portion 63 is of intermediate radius, and a third portion 64 is of minimum radius. These three peripheral portions of the cam 14 cooperate with an operating member 65 of a pair of switches 66 and 67. The switch 66 controls the connection between a pair of conductors 68 while the switch 67 controls the connection between a pair of conductors 69. When the operating member 65 is in contact with the peripheral portion 64 of the cam 14, both switches 66 and 67 are closed. When the operating member 65 is in contact with the intermediate radius portion 63 of the cam 14, the switch 67 is opened and the switch 66 remains closed. When the operating member 65 is in contact with the portion 62 of maximum radius of the cam 14, both switches 66 and 67 are opened.

In one manner of operation of the apparatus, it is desired only that the switches 66 and 67 shall be opened and closed simultaneously at all times. When such is the case it is unnecessary to use the pin 53, and it may be removed from the projection 56, that projection being then unused.

The operation of the apparatus is as follows: The switches 66 and 67, as illustrated are closed, the switch 22 is opened, since no carrier current is on the conductors 15, and the motor 10 is deenergized because the switch 23 is held open by the arm 12 in the above mentioned predetermined position. Upon reception of a carrier current impulse on conductor 15, the switch 22 closes, and energizes the motor 10, which turns the arm 12 and the rotating disc member 13, which is attached to the arm 12 for clockwise rotation therewith through a pin 70 fixed on the arm 12 and cooperating with one of a series of holes 71 in the face of the member 13. The arm 12 turns until the end of the movable member 40 is freed and the switch 23 closes.

As explained previously, when the switches 22 and 23 are both closed, the motor 10 is deenergized. So long as the carrier current impulse continues on the conductors 15, therefore, the switch 22 remains closed, and the motor 10 remains deenergized. At the end of the carrier current impulse, the switch 22 opens, and the motor 10 becomes energized through the switch 23. After the motor begins to run, it continues to turn the arm 12 through a complete cycle of operation until it returns to the predetermined position and moves the free end of the movable arm 40 outwardly to open the switch 23, provided with the free end of the movable member 41 is in one of the notches 42, 43 or 44. The pin 54 during the energization of the motor 10 is attracted to the projection 61 and does not bear against the periphery of the member 13.

As the motor continues to rotate, if a second carrier current impulse is received, the switch 22 closes to deenergize the motor 10 and allow the pin 54 to drop again to the periphery of the member 13. When such carrier current impulse ceases, the switch 22 reopens and the motor 10 is reenergized to continue operation. If, at the time of reception of this carrier current impulse, the notch forming the shoulder 51 was not under the enlarged end 60 of the pin 54, the pin 54 could not drop so far that it would not be lifted again by the magnetic action in the projection 61. Thus, provided no carrier current impulse is received while the notch forming the shoulder 51 is under the pin 54, the motor 10 operates to return the arm 12 to its initial position, where the switch 23 is reopened, thereby stopping the motor.

If, however, such second carrier current impulse is received at the instant the notch forming the shoulder 51 is directly under the pin 54, the pin 54 drops within such notch, and the magnetic action in the projection 57 is not sufficient to raise the pin 54 therefrom. When such carrier current impulse ceases, the motor is reenergized, and the pin 54 is not lifted, so that, when the arm 12 and member 13 begin again to rotate, the shoulder 51 bears against the enlarged head 60 of the pin 54 so that the cam 14 is carried with the arm 12 and member 13. As soon as the cam 14 rotates, the movable end of the member 41 moves out of the notch 42, thereby assuring that the switch 23 must remain closed, even though the arm 12 moves past the free end of the movable member 40.

After the cam 14 has been moved through an angle of 90°, the free end of the movable member 41 encounters the notch 43, and switches the cam 14 ahead through a small angle while slipping down into the notch 43. Since the pin 54 is at this time horizontal, it does not move from the notch which forms the shoulder 51, and the motor 10 continues to rotate so that the member 13 thereupon switches the pin 54 and cam 14 through the shoulder 51 through further rotation.

After the cam 14 has moved about 180°, the free end of the movable member 41 slips down into the notch 44 and again moves the cam 14 ahead through a small angle, so that the enlarged end 60 of the pin 54 is freed from the shoulder 51. The pin 54 thereupon drops through the projection 57 until it is stopped by its enlarged head 60. Thereafter the arm 12 and member 13 continue rotation until the arm 12 encounters the free end of the movable member 40 and opens the switch 23, thereby deenergizing the motor 10.

As the apparatus thus remains, with the cam 14 moved through 180°, the peripheral portion 62 of maximum radius of the cam 14 is under the operating member 65 of the switches 66 and 67, so that these switches are both opened. The apparatus is in readiness for a further operation upon the receipt of carrier current impulses.

If now another carrier current impulse is received, the switch 22 closes and energizes the motor 10 to move the arm 12 so that the switch 23 is closed, at which time the motor 10 becomes deenergized. When the carrier current impulse stops, the switch 22 opens, so that the motor 10 is energized through the switch 23. If no further carrier current impulse is received, or if a carrier current impulse is received when the notch forming the shoulder 50 is not under the pin 52, which is now in its uppermost position, the motor 10 continues running, except during the reception of carrier current impulses, and finally returns the arm 12 to the predetermined position where it opens the switch 23 without rotating the cam 14. If, however, during the rotation of the arm 12 and the member 13, another carrier current impulse is received at the instant when the notch forming the shoulder 50 is under the pin 52, the pin 52 is released by the projection 61 and dropped into the notch forming the shoulder 50. After such carrier current impulse stops, the projection 61 cannot lift the pin 52 again, so that upon further rotation of the arm 12 and member 13, the cam 14 is carried along.

After the cam 14 has rotated 180°, the free end of the movable member 41 drops within the notch 42, thereby causing the cam 14 to move forward slightly and release the pin 52 from the notch forming the shoulder 51 so that it drops downward to the position shown. Thereafter the arm 12 and member 13 continue rotating until the arm 12 opens the switch 23. Such operation moves the peripheral portion 62 of maximum radius from the operating member 65, thereby allowing the member 65 to drop to the peripheral portion 64 of minimum radius and close both the switches 66 and 67.

As thus described a complete operating cycle including the opening of both switches 66 and 67, and their subsequent simultaneous closure, has been described. It should be noted that the operation of the cam 14 depends on the reception of two consecutive carrier current impulses spaced by a predetermined amount. In order to open both of the switches 66 and 67, two consecutive carrier current impulses must be received spaced by a predetermined amount. In order to close both these switches, two consecutive carrier current impulses must be received, spaced by a different predetermined amount. The necessary spacing between the two carrier current impulses required for operation of cam 14 depends on the angular distance between the shoulders 50 and 51 and the arm 12. The fact that different spacings between the two impulses are required for the opening and for the closing of the two switches results from the fact that the shoulders 50 and 51 are spaced by different amounts angularly from the arm 12. The angular spacing of the shoulders 50 and 51 from the arm 12 may be adjusted by sliding the arm 12 outward along the shaft 11, to which it is keyed, until the pin 70 is released from the hole in which it is engaged. The rotating disc member 13 may then be rotated through any desired angle to adjust the angular spacing between the shoulders 50 and 51 in the arm 12, and the pin 70 may thereupon be reinserted in the appropriate hole 71.

A modified action may be provided wherein the switches 66 and 67 may be operated at different times, if desired. To produce such modified action, the pin 53 is placed in the projection 56, and a permanent magnet 80 is placed at the same radial distance from the shaft 11 as the projection 61 in the same plane at right angles to the shaft 11, and in the same horizontal plane as the shaft 11. With the parts so arranged, the switches 66 and 67 are closed simultaneously, but they are opened independently as follows.

In the position shown, both switches 66 and 67 are closed, and receipt of two properly spaced carrier current impulses result in the opening of switch 67 alone. Upon the reception of the first of such carrier current impulses, the switch 22 closes to operate the motor 10 until the switch 23 is closed. After the carrier current impulse stops the switch 22 opens, so that the motor 10 is energized through switch 23, and the arm 12 and member 13 rotates until the notch forming the shoulder 51 is under the pin 54. At this time the second carrier current impulse must close the switch 22 to deenergize the motor 10 and drop the pin 54 against the shoulder 51. When the carrier current impulse stops, the motor is reenergized upon the opening of switch 22 and the arm 12 and member 13 proceed to rotate the cam 14 through the shoulder 51 and pin 54.

After the cam 14 has rotated through 90°, the free end of the movable member 41 drops within the notch 43, thereby pushing the cam 14 forward through a small angle, and releasing the pin 54 from the frictional engagement within the projection 57 caused by its pressure against the shoulder 51, so that the permanent magnet 80 withdraws the pin 54 from the member 13. Upon further rotation of the motor 10, the cam 14 remains in this position, where the peripheral portion 63 of intermediate radius is under the operating member 65, so that the switch 67 is open and the switch 66 is closed.

Thereafter the motor continues to rotate, carrying with it the arm 12 and member 13, until the switch 23 is opened to deenergize the motor 10.

Two additional carrier current impulses, spaced by the same amount, may now be received to carry the cam 14 through an additional 90° rotation, and open the switch 66. Upon the reception of the first of such impulses, the motor 10 is energized and causes the switch 23 to close by movement of the arm 12, and after such carrier current impulse stops, the motor 10 turns the arm 12 and member 13 under the pin 53. Upon the closure of the switch 22 by the second properly spaced carried current impulse, at the time when the pin 53 is above the notch forming the shoulder 51, the motor 10 is deenergized and the pin 53 drops against the shoulder 51. After this second carrier current impulse stops, the motor again rotates and carries the arm 12, member 13 and cam 14 along through 90° rotation, until the free end of the movable member 41 drops within the notch 44, thereby causing a slight forward rotation of the cam 14 and a consequent freeing of the pin 53 from frictional engagement within the projection 56, so that the permanent magnet 80 withdraws the pin 53 from the member 13. Further rotation of the motor 10 causes the arm 12 and member 13 to move until the switch 23 is opened and deenergizes the motor 10.

After these operations the peripheral portion 62 of the cam 14 is under the operating member 65, and both switches 66 and 67 are open. Receipt of two more properly spaced carrier current impulses is effective to move the peripheral portion 62 of the cam 14 away from the operating member 65 and moves pin 54 back to the uppermost position, as described above.

The type of operation just described provides that both the switches 66 and 67 are closed simultaneously, while the switch 67 is opened alone, and the switch 66 may be opened thereafter at any desired time. Such operation of two switches is desirable in certain applications, such, for example, as the operation of two street light circuits where it is desired that both circuits be on from dusk until some time late at night, at which time one circuit is turned off. The remaining circuit may be then kept on until dawn and then turned off. Alternatively, the device so described may be found useful for controlling water heaters, such as contain a low current heater and a high current heater. During the maximum load of the day, which normally occurs during the afternoon, both of the heaters may be turned off, while in the early evening the light heater may be turned on, and both heaters may be turned on for the remainder of the day.

It should be noted particularly, in the embodiment of my invention shown in Fig. 1 using the pin 53 and the permanent magnet 80, that a pin engaged with either of the shoulders 50 and 51 cannot be freed therefrom either by the pull of the permanent magnet 80 or by the pull of gravity when the cam is in its lowermost position, unless the cam 40 is slightly advanced as such pin is passing the magnet 80 or is at its lowermost position where gravity can act on it. A pin so engaged with one of the shoulders 50 or 51 is therefore not freed therefrom unless the free end of the movable member 41 passes into one of the notches 42, 43 or 44 in the cam 14 at the time when such pin is adjacent the magnet 80 or is at its lowermost position. For example, when the pin 54 is at its lowermost position and the pin 52 is under the projection 61, so that both switches 66 and 67 are opened, the receipt of two properly spaced consecutive carrier current impulses is effective to engage the enlarged end 58 of the pin 52 with the shoulder 50. As the pin 52 is carried past the permanent magnet 80, when the cam 14 has turned through an angle of 90° from the position where the pin 52 was in its uppermost position, the free end of the movable member 41 does not encounter a notch, the surface of the cam 14 near the projection 56 being moved. Since the cam 14 is not advanced slightly by passage of the free end of the member 41 into such a notch, the pin 52 remains engaged with the shoulder 50 and is carried past the permanent magnet 80 and downward into its lowermost position. As explained previously, at this lowermost position the free end of the member 41 engages the notch 42, as illustrated in the figure, and disengages the end 58 of the pin 52 from the shoulder 50, thereby allowing it to drop free of the member 13.

Various forms of the cam 14 may be used, other than that shown. Obviously, when the pin 53 and permanent magnet 80 are not used, the projection 56 may be omitted entirely if desired, as well as the peripheral portion 63 of intermediate radius. Furthermore, the cam surfaces 62, 63 and 64 need not necessarily be at the periphery of the cam 14, but may instead be displaced axially, thereby to produce an axial movement of an operating member such as a member 65. Any other suitable form of cam surfaces may be used if desired.

Figure 2:
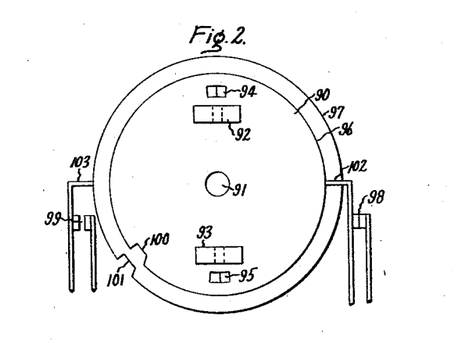
Figs. 2 and 3 illustrate schematically certain modifications of a portion of Fig. 1

In Fig. 2, a different form of cam is shown which is effective to open one switch momentarily during one-half revolution, and to close another switch momentarily during the other half revolution. The cam 90 has a central bearing 91 adapted to be journaled on the shaft 11 in place of the cam 14, and also has projections 92 and 93 and notches 94 and 95 corresponding to the projections 57 and 55 and notches 44 and 42 of the cam 14. These projections and notches cooperate with the pins 52 and 54 and with the free end of the movable member 41 in the same way as through the corresponding parts of the cam 14. The mechanism illustrated in Fig. 1 is therefore effective through the medium of these projections and notches, to turn the cam 90 one-half revolution upon receipt of any two consecutive properly spaced carrier current impulses.

The peripheral surface of the cam 90 is divided into two axially spaced portions 96 and 97, cooperating respectively with switches 98 and 99. The cam surfaces 96 and 97 respectively have short depressions 100 and 101 near each other along the circumference of the cam 90. Otherwise the surfaces 96 and 97 are of substantially uniform radius. An operating member 102 for the switch 98 rests against the cam surface 96 and maintains the switch 98 closed except when the member 102 drops into the depression 100. Similarly, an operating member 103 is associated with the switch 99 and rests against the cam surface 97 to maintain the switch 99 open except when the member 103 drops into the short depression 101.

When such a cam 90 associated with switches 98 and 99 as shown in Fig. 2 is utilized in the apparatus of Fig. 1, such apparatus is then effective to close one circuit momentarily upon the receipt of two consecutive properly spaced carrier current impulses, and to open a second circuit momentarily upon the receipt of two consecutive differently spaced carrier current impulses. Such an apparatus is especially useful in a motor control circuit as will be explained later.

Figure 3:
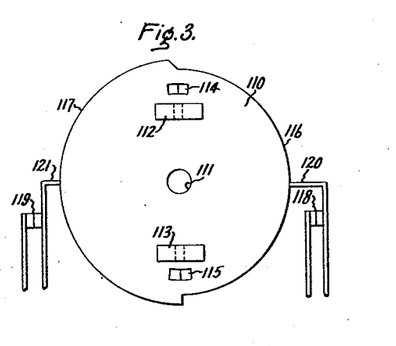

In Fig. 3 a cam 110 is shown, which has a bearing 111, to be journaled on the shaft 11 and also has projections 112 and 113 and notches 114 and 115, corresponding to the projections 57 and 55 and the notches 44 and 42 of the cam 14. This cam 110 operates in the apparatus of Fig. 1 in the same way as the cams 90 and 14.

The cam 110 has its peripheral surface divided circumferentially into two equal portions 116 and 117, of which the portion 117 is of substantially greater radius. Two switches 118 and 119 are disposed on opposite sides of the cam 110 and have respective operating members 120 and 121 associated therewith. When the operating member 120 rests against the peripheral portion 116 of the cam 110, the switch 118 is closed, while when the operating member 120 is carried upon the peripheral portion 117 of the cam 110 by its motion under the switch 118, the switch 118 is opened. The operating member 121 maintains the switch 119 closed so long as it rests upon the peripheral portion 117, while the member 121 is effective to open the switch 119 when it drops upon the peripheral portion 116. Consequently, in the position shown both the switches 118 and 119 are closed, and the cam 110 is effective to open both of the switches 118 and 119 when it moves through one-half revolution.

The cam 110 of Fig. 3 actually produces the same circuit actuations as the apparatus illustrated in Fig. 1 when the pin 53 and the permanent magnet 80 are not used, since the cam 14 under such conditions can never stop with the peripheral portion 63 of the cam 14 under the operating member 65 of the switches 66 and 67. As explained before, the cam 14 always stops with either the portion 64 or the portion 62 under the operating member 65, so that the switches 66 and 67 are always either both open or both closed. Either of these modifications of the device is therefore useful to operate two different circuits simultaneously to open and close circuit conditions.

Figure 4:
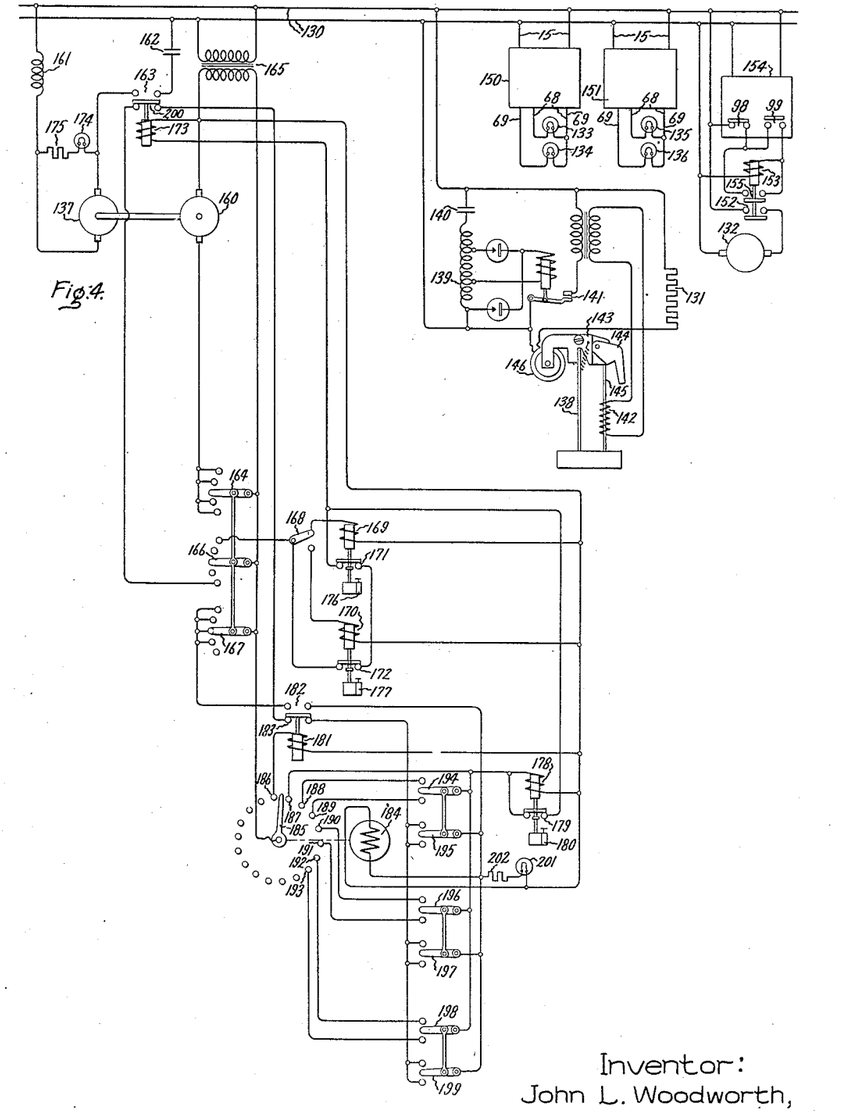
Fig. 4 illustrates schematically a carrier current system including a transmitter and several receivers embodying my invention.

In Fig. 4 a pair of main conductors 130 extend from a source of electric power, not shown, to various loads including a load indicated as a resistance 131, which may, for example, represent a water heater load or the like, a motor 132, and lamps 133, 134, 135 and 136. A carrier current transmitter, including a high frequency alternator 137, is connected to the conductors 130 to impress carrier current thereon. Each of the loads 131 through 136 is connected to the conductors 130 through a carrier current control receiver which is adapted to connect or disconnect the associated load from the conductors 130 upon the receipt of appropriate carrier current impulses.

The resistance load 131 is connected to the conductors 130 through a carrier current control receiver including a thermally responsive device 138. This receiver including the device 138 is shown in Fig. 5 of U. S. Letters Patent 2,064,644, and is described and claimed therein, this patent being issued to me on December 15, 1936, and assigned to the same assignee as the present application. Briefly, this control receiver includes a series tuned circuit comprising an inductance 139 and condenser 140 connected between the conductors 130 and resonant at the frequency of carrier current impulses impressed thereon by the high frequency alternator 137. Voltage across the inductance 139 is effective to close the switch 141, thereby energizing a heater 142 by power from the conductors 130. The heater 142 is a part of the thermally actuated device 138 and acts through the medium of cam elements 143 and 144 and through a bimetallic strip 145 to rotate the mercury switch 146 to closed circuit position upon the energization of the heater 142 for a short period of time, for example, for 10 seconds. The cam element and the bimetallic strip are also effective to rotate the switch 146 to open circuit position upon energization of the heater 142 for a longer period of time, for example, for 40 seconds. The carrier current control receiver including the thermally actuated device 138 is therefore effective to connect the load 131 to the conductors 130 upon the receipt of a carrier current impulse of predetermined length, and to disconnect that load 131 from the conductors 130 upon receipt of a carrier current impulse of a longer predetermined length.

The lamp loads 133 and 134 are illustrated as being connected to the conductors 130 through a carrier current control receiver, shown as a rectangle 150. The receiver so illustrated is identical to that illustrated in Fig. 1 using the cam 14 without pin 53 and without permanent magnet 80, or instead of cam 14 using cam 110 of Fig. 3. Mains conductors 15, illustrated in Fig. 1, are illustrated also in Fig. 4 connected between the mains conductors 130 and rectangle 150. The lamp load 133 is shown connected between conductors 68, while the lamp load 134 is shown connected between conductors 69, one of the conductors 68 being common to one of the conductors 69.

The lamp loads 135 and 136 are shown connected to the mains conductors 130 through a carrier current control receiver illustrated as a rectangle 151. This receiver is identical with that shown in Fig. 1 including the pin 53 and permanent magnet 80 except that pin 70 and arm 12 are in a different location with respect to member 13. That is, pin 70 is in a different one of holes 71. The conductors 15 are shown as connecting the receiver 151 to the mains conductors 130, while the lamp loads 135 and 136 are respectively connected to the receiver 151 by conductors 68 and 69.

The receiver 150 is arranged to connect the lamp loads 133 and 134 to the mains conductors 130 upon receipt of two consecutive suitably spaced short carrier current impulses, each of which must be substantially shorter than the shorter of the two impulses which operate the thermally actuated device 138. The receiver 150 is also arranged to disconnect the lamp loads 133 and 134 from the mains conductors 130 upon receipt of two consecutive differently spaced short carrier current impulses. The receiver 151 is, on the other hand, arranged to connect both the lamp loads 135 and 136 to the mains conductors 130 upon the receipt of two consecutive carrier current impulses spaced by still a third time interval, while it is arranged to disconnect the lamp load 136 first upon the receipt of two consecutive carrier current impulses spaced by still a fourth time interval, and to disconnect the lamp load 135 from the mains conductors 130 upon receipt of two more consecutive short carrier current impulses spaced by this fourth time interval.

The motor 132 is connected between the mains conductors 130 through one set of contacts 152 of an electromagnetic switch having an operating coil 153. A carrier current control receiver, illustrated as a rectangle 154, includes normally open contacts 99, and normally closed contacts 98, illustrated respectively as switches 99 and 98 in Fig. 2. The receiver 154 is identical with that illustrated in Fig. 31, except that the cam 90 of Fig. 2 is used in place of the cam 14, and the pin 70 is in one of the holes 71 different from either of the receivers 150 and 151.

Connections for the switches 98 and 99 and the operating coil 153 are so arranged that closure of the switch 99 connects the operating coil 153 through the closed switch 98 across the mains conductors 130. Energization of the operating coil 153 closes the contacts 152 and energizes the motor 132. Operation of the switch by the operating coil 153 also closes a second set of contacts 155 which are connected in parallel to switch 99, so that when switch 99 opens after an instant of closure, the operating coil 153 is still connected across the mains conductors 130 through the normally closed switch 98 and the seal-in contacts 155. The motor 132 therefore is maintained in operation after the switch 99 has been closed momentarily.

A momentary opening of the switch 98 is effective to break the circuit through which the operating coil 153 is connected across the mains conductors 130, thereby opening the contacts 152 to deenergize the motor 132 and opening the seal-in contacts 155 to prevent reenergization of the operating coil 153 when the switch 98 recloses.

The carrier current control receiver 154 is therefore effective to start the motor 132 upon the receipt of two consecutive short carrier current impulses spaced by a fifth time interval and to stop the motor 132 upon the receipt of two more consecutive short carrier current impulses spaced by a sixth time interval.

The carrier current transmitter including the high frequency alternator 137 is arranged to transmit carrier current pulses for operating the thermal device 138 to connect or disconnect the load 131 from the conductors 130, or to operate any one or all of the receivers 150, 151 and 154 to connect or disconnect their associated loads, as desired, from the conductors 130. The high frequency alternator 137 is mechanically connected to a motor 160, which drives the alternator at a speed suitable to produce carrier current at any desired frequency. A commonly used frequency for this type of carrier current control is 720 cycles. The high frequency alternator 137 is connected through an inductance 161, a condenser 162, and normally open contacts 163 of an electromagnetic switch between the mains conductors 130. The inductance of the alternator 137, together with the inductance 161 and condenser 162 is made resonant at the frequency of carrier current generated by the alternator 137. Whenever the motor 160 is operating, and the normally open contacts 163 of the electromagnetic switch are closed, carrier current is transmitted through the mains conductors 130.

Operation of the motor 160 is controlled by a switch 164 which is movable to any one of five positions. In the center position of switch 164 all circuits through the motor 160 are interrupted, so that the motor stops. In all other positions of the switch 164 an operating circuit for the motor 160 is completed through the switch 164, motor 160, and a suitable source of operating voltage therefor, which may conveniently be a transformer 165 energized by voltage between the main conductors 130.

The switch 164 is actually one portion of a master switch which includes two other switch elements 166 and 167, all three of the elements 164, 166 and 167 being connected together for unitary control. The movable members of all three of the switch elements 164, 166 and 167 are connected to the same terminals of the secondary of transformer 165. The three intermediate positions of the switch element 166 are arranged to produce no circuit connections. In the upper position of the three movable members, a circuit is completed from the one terminal of the secondary of transformer 165 through the movable member of switch element 166, and through the movable member of a two-position switch 168 in its upper position through the operating coil 169 of a time delay electromagnetic switch, and in the lower position of the movable member of switch 168 through the operating coil 170 of a second time delay electromagnetic switch, back to the other terminal of the secondary of transformer 165. An additional circuit is completed when the switch element 166 is in its upper position extending from one terminal of the secondary of transformer 165 through the switch 166 and through the normally closed contacts 171 and 172 of both of the time delay electromagnetic switches in series and through the operating coil 173 of the switch which includes the normally open contacts 163 back to the other terminal of the secondary of transformer 165.

The portions of the carrier current transmitter so far described are arranged to transmit automatically carrier current impulses suitable for the operation of the thermal actuating device 138 to connect or disconnect the load 131 from the conductors 130. As the thermal device 138 is illustrated in Fig. 4, the switch 146 is in open circuit position and the device is ready to respond to a relatively short carrier current impulse, for example, of the order of ten seconds in length, to close the circuit to the load 131. To produce transmission of such a carrier current impulse, the switch 168 in the transmitter is moved to its upper position and switches 164, 166 and 167 are moved one position upward from the middle position. Upon such movement of the switch 164, the motor 160 is energized and begins to rotate the high frequency alternator 137. When the alternator 137 is rotating at the proper speed, so that the voltage which it produces is of the proper magnitude and frequency, a lamp 174, connected in series with a resistance 175 between the terminals of the alternator 137 becomes bright, thereby indicating that the alternator 137 is rotating at the proper speed. After the lamp 174 has reached the proper steady brightness, the switch 164 is moved upward to its top position, in which the motor 160 continues operation and in which the switch 166 completes an energizing circuit through the operating coil 169 of the upper time delay relay. This relay is provided with some means, such for example as the dashpot 176 for producing any desired time delay in the opening of the normally closed contacts 171. In the example given, in which a ten seconds carrier current impulse is sufficient to actuate the thermal device 138 to closed circuit position, the dashpot 176 may be so adjusted that the contacts 171 are opened after the coil 169 has been energized for about 10 seconds.

Until the contacts 171 of the upper time delay relay are so opened, the switch 166 completes a second circuit through the operating coil 173 of the carrier current relay, thereby closing the normally opened contacts 163 and initiating the transmission of carrier current through the conductors 130. Upon reception of such carrier current, the switch 141 closes and energizes the heater 142. After a time somewhat less than the time required for the operating coil 169 to open the normally closed contacts 171, the heater 142 is effective to bend the bimetallic strip 145 sufficiently to release the cam member 143 and allow the switch 146 to be moved by spring action to circuit closing position, thereby energizing the load 131. After the contacts 171 open, the operating coil 173 is deenergized, thereby stopping the transmission of carrier current and leaving the thermal device 138 in circuit closing position. Although the motor 10, arm 12, and member 13 of each of the receivers 150, 151, and 154 are started in rotation when contacts 163 are closed, the motors stop when contacts 23 close. When contacts 163 open the motors complete a revolution but do not change the connections of their respective loads. At his leisure the operator may return the switch elements 164, 166 and 167 to the middle position, in order to stop the operation of the motor 160.

To operate the transmitter in order to cause disconnection of the load 131 from the conductors 130, the switch 168 is moved to its lower position, and the motor 160 is started as before by moving the switch element 164 to its first position above the middle position until the lamp 174 reaches a constant steady brightness. Thereafter the switch element 164 is moved to the top position, thereby completing a circuit through the switch element 166 and through switch 168 and the operating coil 170 of the lower time delay relay. This lower time delay relay is also provided with some means, such for example as a second dashpot 177 for producing a predetermined time delay after energization of the operating coil 170 before the normally closed contacts 172 are opened. When the switch element 166 is moved to the upper position, another circuit is completed through the switch element 166, normally closed contacts 172 and 171 in series and the operating coil 173, thereby causing closure of the normally opened contacts 163 and transmission of carrier current. After a predetermined time, which in the example given may be of the order of 40 seconds, the operating coil 170 is effective against the delay of the dashpot 177 to open the contacts 172 and cause deenergization of the operating coil 173, thereby causing cessation of the transmission of carrier current.

This last pulse of carrier current is effective in heating the heater 142 of the carrier current receiver so much that the bimetallic strip 145 bends outward and engages the cam 144, so that after the last pulse ceases, the bimetallic strip 145 cools and turns the switch 146 to circuit opening position. As before, the motors 10 of each of the receivers 151, 153, and 154 are started and operate through one revolution without changing the connections of their associated loads.

The carrier current transmitter is provided with certain additional equipment for transmitting two or more consecutive properly spaced short carrier current impulses for the operation of receivers such as the receivers 150, 151 and 154. This additional apparatus includes a pair of switches connected together for unitary control for each of the receivers, or if desired for each group of receivers to be operated simultaneously, on the system. This additional apparatus also includes a third time delay relay having an operating coil 178, normally closed contacts 179 and some means for causing time delay in the opening of the contacts 179, such for example as a dashpot 180. A resetting relay having an operating coil 181, normally open contacts 182 and normally closed contacts 183, and a motor 184 are also provided. It is preferred that the motor 184 be of the type illustrated in Fig. 1 as motor 10. This motor 184 is arranged to rotate a switch arm 185 in a clockwise direction to make contacts successively with a series of stationary contacts 186 through 193. As many contacts as desired may be provided, and it is necessary that there be at least two contacts for each receiver, or group of receivers to be operated simultaneously, and at least two additional contacts.

As explained above, two switches 194 and 195, connected together for unitary operation, are provided for the receiver 150, while similar paired switches 196, 197 and 198, 199 are provided respectively for receivers 151 and 154. Each of these switches 194 through 199 has three positions, the middle position being effective to complete no circuit, so that no corresponding action of the associated receiver is produced. Each of the switches 194 through 199 may be moved to its upper position to produce a corresponding circuit connecting action of the associated receiver, and may similarly be moved to its lower position to cause a circuit disconnecting action of the associated receiver when the transmitter is set in operation by proper movement of the switch elements 164, 166 and 167.

The movable member of each of the switches 194, 196 and 198 is connected to the contacts 187 associated with the rotating member 185, and also with one of the normally closed contacts 179 and with one terminal of the operating coil 178 of the third time delay relay. The other terminal of the coil 178 is connected to the same terminal of the secondary of transformer 165 as that to which the operating coil 173 of the carrier current relay is connected. The other contact 179 is connected through the operating coil 173 to the same terminal of the secondary of transformer 165.

The movable members of the switches 195, 197 and 199 are connected together and to one of the normally open contacts 182. The other normally open contact 182 is connected to stationary contacts associated with the switch element 167 in every position of that switch element except the lower position, in which no circuit is completed.

The switches 194, 196 and 198 have upper and lower stationary contacts respectively connected to the stationary contacts 188 through 193 associated with the movable arm 185. The switches 195, 197 and 199 have stationary contacts which are all connected together and are connected through the normally closed contacts 183 of the resetting relay and normally closed contacts 200 of the carrier current relay to the lower stationary contacts of the switch element 166 through which circuit connection is made in the lowermost position of the switch elements 164, 166 and 167.

The motor 184 is connected between the movable members of the switches 195, 197 and 199 and that terminal of the secondary of transformer 165 to which the operating coil 178 is connected. A lamp 201 in series with a resistance 202 is connected in shunt to the motor 184 to indicate that the motor is in operation.

Such additional apparatus in the transmitter may be operated in the following manner. If it be desired to produce a circuit connecting operation by the receiver 150, the switches 194 and 195 may be moved to their upper positions. Thereafter the switch elements 164, 166 and 167 are moved down one position from their middle positions, thereby starting the motor 160 and alternator 137 as before. When the alternator 137 is up to speed, as indicated by the lamp 170, the switch elements 164, 166 and 167 may be moved to their lowermost positions, so that a circuit is completed from one terminal of the secondary of transformer 165 through the switch element 166, normally closed contacts 200 of the carrier current relay, normally closed contacts 183 of the resetting relay, switch 195, and motor 184 back to the other terminal of the secondary of transformer 165. The motor 184 is thus energized, as indicated by the lamp 201, and proceeds to begin clockwise rotation of the arm 185 from its normal position between the contacts 186 and 187. When the arm 185 touches the stationary contact 187, a circuit is completed from one terminal of the secondary of transformer 165 through the arm 185, contact 187, normally closed contacts 179 of the third time delay relay, and operating coil 178 of the carrier current relay to the other terminal of the secondary of transformer 165. Normally open contacts 189 of the carrier current relay are thereby closed and the transmission of carrier current over conductors 130 to the receiver 150 is initiated. The contacts 186 through 193, the arm 185, and the motor 184 are all arranged so that contacts between the arm 185 and any stationary contact is maintained during rotation of the motor for a period longer than the duration of a short carrier current impulse such as required to operate the receivers 150, 151 and 154. The dashpot 180 of the third time delay relay is adjusted so that the contacts 179 remain closed after energization of the operating coil 178 for a time just equal to the duration of such short carrier current impulses. The operating coil 178 is connected in parallel with the operating coil 173 through the normally closed contacts 179, and is energized at the same time as the operating coil 173. Consequently, before the arm 185 leaves the stationary contact 187, the normally closed contacts 179 are opened and the operating coil 173 is deenergized after transmission of the first of two consecutive short carrier current impulses. Transmission of this first short carrier current impulse is ineffective to produce any substantial heating of the heater 142, but is effective to start the motor 10 and the associated arm 12 and the member 13 and each of the receivers 150, 151 and 154 in rotation.

Contact 179 remains open and prevents the transmission of further carrier current until the arm 185 leaves the stationary contacts 187 at which time the operating coil 178 is deenergized so that contacts 179 reclose. After a certain time interval determined by the speed of rotation of the motor 184 and the spacing between the stationary contacts 187 and 188, the arm 185 touches the contact 188 and completes the same circuits as were formerly completed through the stationary contacts 187, such circuits being this time completed through the switch 194 in its upper position. Consequently, a second short carrier current impulse is transmitted in the same manner as the first, a predetermined time interval having elapsed between the transmission of the two impulses.

The member 13 of the receiver 150 is so adjusted angularly with respect to the arm 12 that the notch forming the shoulder 50 is directly underneath pin 52 of the receiver 150 when the second short carrier current impulse is received. Consequently, the cam 14 or one pin of the receiver 150 is turned one-half revolution, thereby causing closure of the switches 66 and 67 and connection of the lamp loads 133 and 134 to the conductors 130.

Although the motor 10 and arm 12 and member 13 of each of the receivers 151 and 154 were started in rotation upon receipt of the first carrier current impulse initiated when the arm 185 touched the stationary contact 187, the member 13 and each of these receivers 151 and 154 is so adjusted with respect to the arm 12 therein that the notch forming the shoulder 50 is not under the pin 52 when the second short carrier impulse was received. Consequently, the operating cam in each of these two receivers is not operated, and the associated loads are not connected.

As the arm 185 rotates past the stationary contacts 188 and touches successive stationary contacts 189 through 193, nothing further happens since none of the switches 194 through 199 is connected to such contacts to provide for circuit completion when the arm 185 touches them. No operation other than the connection of the lamp loads 133 and 134 to the conductors 130 takes place.

When the arm 185 completes nearly a whole revolution, it touches the stationary contacts 186 and completes the circuit from one terminal of the secondary of transformer 165 through the arm 185, stationary contacts 186, operating coil 181, back to the other terminal of the secondary of transformer 165. The resetting relay being thus energized, the operating circuit for the motor 184 through the normally closed contacts 183 is interrupted by their opening. There is no further operation of the transmitter until the switch elements 164, 166 and 167 are moved.

At the operator's leisure the switch elements 164, 166 and 167 may be moved to any position other than the lowermost position during which the above described operation took place. Upon such motion of the switch element 167, a circuit is formed from one terminal of the transformer secondary 165 through switch element 167, normally open contacts 182 (the operating coil 181 still being energized), motor 184 and back to the other terminal of the transformer secondary 165. The motor 184 thereupon rotates and moves the arm 185 from the stationary contacts 186 to deenergize the operating coil 181. When the operating coil 181 is deenergized, the normally opened contacts 182 reopen and deenergize the motor 184, which thereupon stops rotating with the arm 185 in its normal rest position between the contacts 186 and 187. The resetting relay including the operating coil 181 is effective to operate the motor 184 to move the arm 185 just beyond the stationary contacts 186 no matter in what position the switches 194 through 199 may be. These switches 194 through 199 may therefore be set for the next desired operation, or they may be set in their intermediate inoperative positions, either before or after the switch elements 164, 166 and 167 are moved upward from their lowermost positions.

The necessary operation of the transmitter to cause the receiver 150 to disconnect the lamp loads 133 and 134 from the conductors 130 comprises moving the switches 194 and 195 to their lower position, starting the motor 160 by moving switch element 164 down one position from its middle position, until the alternator 137 is up to speed, and thereafter moving the switch elements 164, 166 and 167 to their lowermost positions to cause the motor 184 to produce one revolution of the arm 185, thereby causing the transmission of two successive short carrier current impulses in the same manner as before, the two impulses being spaced somewhat differently. The first impulse is transmitted as before when the arm 185 touches the stationary contacts 187. No operation of the transmitter results when the arm 185 touches the stationary contacts 188, since the switch 194 is not connected thereto. Only when the arm 185 touches the stationary contact 189 does the second short carrier current impulse become transmitted, the switch 194 completing a circuit through the arm 185 and stationary contacts 189 for such transmission.

The receiver 150 is operated to circuit disconnecting position by the receipt of two such more widely spaced short carrier current impulses, because the notch forming the shoulder 51 in the member 13 of the receiver 150 is cut slightly farther along the periphery of the member 13 from the notch forming the shoulder 50, so that the pin 54 can drop into that notch and bear against the shoulder 51 in response to a short carrier current impulse which lags behind a previous short carrier current impulse by a longer interval than that necessary to cause the pin 52 to drop within the notch forming the shoulder 50. After the pin 54 drops within the notch forming the shoulder 51, the cam 14 or one pin of the receiver 150 is turned a half revolution, causing the opening of switches 66 and 67 and the disconnection of the lamp loads 133 and 134 from the mains conductors 130.

In similar fashion, if the switches 196 and 197 are placed in their upper or lower positions, short carrier current impulses are sent as the arm 185 respectively touches stationary contacts 190 or 191, and the member 13 in the receiver 151 is suitably adjusted with respect to the arm 12 to cause both lamp loads 135 and 136 to be connected to the mains conductors 130 to cause the lamp load 136 to be disconnected therefrom. It will be remembered from a description of the receivers illustrated in Fig. 1 including the pin 53 and permanent magnet 80, which corresponds to the receiver 151, that the first set of two consecutive short carrier current impulses properly spaced, as caused by the switches 196 and 197 in their lower position, is effective to disconnect only one of the connected loads by rotation of cam 14 only one quarter revolution. After the switch elements 164, 166 and 167 have been moved to their lowermost positions to cause this first circuit disconnection of the lamp load 136, the other lamp load 135 may be disconnected almost immediately by watching the lamp 201. When the lamp 201 goes out, indicating that the arm 185 has touched the stationary contacts 186, the switch element 167 should be moved upward one position from the lower position, causing the energization of the motor 184 and lamp 201 again until the arm 185 has moved to its normal position between the contacts 186 and 187. When the arm 185 has reached such a position the lamp 201 goes out, and movement of the switch element 167 back to its lowermost position is effective then to cause transmission of another pair of consecutive short carrier current impulses to cause disconnection of the lamp load 135 from the conductors 130.

In similar fashion, the switches 198 and 199 are effective in their upper and lower positions respectively to cause the transmission of pairs of properly spaced consecutive carrier current impulses to actuate the receiver 154 and cause its cam 90 respectively to close switch 99 momentarily or to open switch 98 momentarily.

It is, of course, within the scope of my invention to use more than four different types of receivers, as illustrated in Fig. 4, and further to use more than three different types of receivers such as illustrated in Fig. 1. For example, there are eighteen contacts shown in Fig. 4 associated with the arm 185. Sixteen of these contacts may be utilized in eight pairs for the control of eight different types of receivers.

In the operation of a system which utilizes more than four active contacts associated with the arm 185, and consequently having more than one pair of switches such as the switches 194 and 195, the system has been suitably arranged to make it possible to operate any desired number of the receivers during a single revolution of the arm 185. For example, in the system shown in Fig. 4, all of the switches 194 through 199 may be set at the same time to provide, as desired, on or off operation of the loads associated with the respective receivers 150, 151 and 154, so that upon subsequent operation of the switches 164, 166 and 167 to the lowermost positions, the transmitter is effective to transmit four consecutive short pulses of carrier current suitably spaced to operate all three of the receivers. The first short pulse of carrier current initiates rotation of the member 13 in each of the receivers, and each of the subsequent three short impulses produces a mechanical connection between the member 13 and the operating cam in the particular receiver to produce the desired operation. During such transmission of more than two consecutive carrier impulses in a single rotation of the arm 185, the motors 10 in the respective receivers do not run out of proper angular relation with the arm 185 by reason of the provision of the contact 200 on the carrier relay. Whenever the arm 185 touches one of the contacts 187 through 193, provided the proper one of the switches 194 through 199 is closed, the relays 178 and 173 are energized. When the relay coil 173 is energized, the contacts 200 are opened, thereby stopping the motor 184 and the arm 185 from rotating.

At all times while carrier current is being transmitted, the motor 10 in each of the receivers 150, 151 and 154 is stopped by reason of the closure of the associated switch 22, the switch 23 being closed at such times. Provision of the contacts 200 and the associated circuits is therefore effective to cause the motor 184 and the motors 10 in the receivers 150, 151 and 154 to run in substantial synchronism, thereby maintaining their angular relationship. It is by reason of the fact that all these motors are kept in proper synchronous operation that more than two consecutive carrier current impulses can be transmitted during one revolution of the arm 185 to produce proper operation of the corresponding receivers.

It is obvious that the free end of the movable member 41 may be placed in a different position with respect to the cam 14 provided the notches 42, 43 and 44 are correspondingly placed on the surface of the cam to cooperate with the free end of the member 41. It is similarly possible to place the notches which form the shoulders 50 and 51 at any different peripheral position on the surface of the member 13 so that the operating impulses may be sent at different times from those described above. For example, the shoulder 51 may, if desired, lead the shoulder 50. This may be desirable in certain instances because the shoulder 51 engages with the pin 54 to cause disconnection of the associated loads, and if the shoulder 51 be made to lead the shoulder 50, such disconnection may be made in a shorter time than the corresponding connection.

Alternatively, if it be desired to decrease as much as possible the time necessary for disconnection of loads associated with all such receivers, the notches forming the shoulder 51 in each of the receivers may be placed on that half of the peripheral surface of the member 13 which is not shown in Fig. 1, while all the notches which form the shoulders 50 may be placed on the other half of the peripheral surface of member 13, which half may be seen in Fig. 1. By such arrangement of the shoulders 51, it is only necessary for the member 13 to turn through a small angle, less than 180°, before the shoulder 51 engages the pin 54 to disconnect the associated loads.

It will be appreciated that the member 13 must turn through two revolutions to complete an operation of the associated operating cam if the notch into which the pin 52, 53 or 54 drops is on that half of the peripheral surface of the member 13 following the arm 12. This happens because a half revolution of the member 13 is necessary to complete an operation of the cam 14, so that, if more than a half revolution of the member 13 is necessary to cause engagement of the proper pin with respective notch, there must be more than one revolution to complete the switching operation. As explained above, the arrangement of the movable member 41, switch 23, arm 12, and notches 42, 43 and 44, together with the cam 14 supporting the pins 52, 53 and 54 is effective to cause the proper number of revolutions of the member 13 to complete an operation of the operating cam in any case.

It is to be understood that the wiring between the switches 194 through 199 and the contacts 188 through 193 is of course suitable only where the notches are arranged as shown in Fig. 1 on the member 13. If the notches are arranged in other fashions, the wiring between the switches and contacts in Fig. 4 must be rearranged. For example, if the notches in the member 13 are arranged so that the "off" notches are on the first half of the peripheral surface and the "on" notches on the second half, the switches 194, 196 and 198, etc. must be connected in their "off" positions to the contacts associated with arm 185 which are touched by arm 185 in its first half revolution, while the switches 194, 196, 198 must be associated in their "on" position with the contacts touched in the last half revolution of the arm 185.

It is also possible, if desired, to arrange the notches forming the shoulders 50 and 51 on the members 13 of two different receivers so that two consecutive properly spaced short carrier current impulses which cause one operation on one of the receivers may cause an entirely different operation on the other receiver. For example, one of the receivers may be caused to connect its load while the other receiver is caused to disconnect its load. Furthermore, it is not necessary that the notches forming the shoulders 50 and 51 be so arranged that the reverse operation is caused by two differently spaced carrier current impulses. These remaining, or reverse, operations may instead be caused by entirely separate pairs of carrier current impulses.

The great flexibility and ease of installation of this carrier current system makes it admirably adapted to power systems in which simple carrier current transmitters are already utilized. For example, certain power systems now in use which have carrier current control systems incorporating receivers as illustrated in Fig. 4 including the thermal device 130 are in common use. By the addition of suitable carrier current receivers, such as the receiver shown in Fig. 1, and certain simple control mechanisms for the transmitter including the alternator 137, it is possible to provide for a very large number of control operations with existing equipment.

It is within the scope of my invention that the carrier current receivers be arranged to produce any desired type of circuit control, of which several exemplary forms have been described in detail. It is also within the scope of my invention to provide as many groups of receivers, or single receivers, which may be operated separately by properly spaced pairs of carrier current impulses, as desired.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent in the United States is:

1. In a carrier current control receiver for producing a control operation in response to the reception of two carrier current impulses having a predetermined interval therebetween, the combination of a driving member, a driven member arranged to produce said control operation upon motion thereof, means for causing motion of said driving member after reception of the first of two sequential carrier current impulses, and means for causing engagement between said members to produce said control operation in response to the termination of the first and reception of the second of said two sequential carrier current impulses.

2. In a carrier current control receiver for producing a control operation in response to the reception of two carrier current impulses having a predetermined interval therebetween, said interval being computed only when carrier current is not received, the combination of a driving member, a driven member arranged to produce said control operation upon motion thereof, means for causing continuous motion of said driving member after reception of the first of two sequential carrier current impulses, means for stopping said continuous motion only during reception of subsequent carrier current, and means for connecting said driving member and said driven member in driving relation for the production of a control operation in response to the reception of the second of said two carrier current impulses following the end of said first impulse after a total elapsed time during which carrier current is not received equal to said predetermined interval.

3. In a carrier current control receiver for producing a control operation in response to the reception of two carrier current impulses having a predetermined interval therebetween, the combination of a driving member, a driven member arranged to produce said control operation upon motion thereof, means for causing motion of said driving member after reception of the first of two sequential carrier current impulses, means for causing engagement between said members to produce said control operation in response to the termination of the first and reception of the second of said two sequential carrier current impulses, and means for disengaging said members after the completion of said control operation.

4. In a carrier current system, means for transmitting two sequential carrier current impulses, and means for receiving said impulses to produce a control operation, said means including a driving member and a driven member, means for causing motion of said driving member in response to the termination of the first of said two carrier current impulses, and means for causing engagement between said members in response to the reception of the beginning of the second of said two impulses, said motion causing means being thereafter effective through said driven member to produce said control operation.

5. In a carrier current control receiver for producing a control operation in response to the reception of two carrier current impulses having a predetermined interval therebetween, said interval being computed only when carrier current is not received, the combination of a driving member, a driven member arranged to produce a control operation upon motion thereof, means for causing said driving member to pass through a cycle of operation at a predetermined speed and to return to an initial position whenever it is moved therefrom, means for moving said driving member from said initial position upon the reception of a carrier current impulse, said means being effective to stop said driving member in any position away from said initial position upon the reception of a carrier current impulse, and means responsive to the reception of a second carrier current impulse following the end of said first impulse after said driving member has moved through a predetermined distance at said predetermined speed for stopping said driving member and engaging said members, whereby said driven member is caused to move upon the cessation of said second carrier current impulse thereby to produce said control operation.

6. In a carrier current control receiver for producing a control operation in response to reception of two carrier current impulses having a predetermined interval therebetween, said interval being computed only when carrier current is not received, motor means for causing said control operation upon energization for said predetermined interval, and means for energizing said motor in response to the reception of a first carrier current impulse and for deenergizing said motor in response to the reception of a second carrier current impulse, said means comprising a pair of impedances connected in series across said motor, means responsive to the reception of carrier current for impressing a voltage across one of said impedances, and means for impressing an opposite voltage across the other of said impedances at all positions of said motor except its initial position, said motor being energized by separate operation of either of said voltage impressing means, but being deenergized by simultaneous operation of both of said voltage impressing means whereby said motor is energized during said interval between said first and second carrier current impulses and causes said control operation.

7. In combination, in a carrier current control receiver, a motor, a pair of impedances connected in series across said motor, means responsive to the reception of carrier current for impressing a voltage across one of said impedances effective to energize said motor through the other of said impedances, and means responsive to motion of said motor for impressing an opposite voltage across the other of said impedances effective to energize said motor through said first impedance, whereby said motor is energized whenever either of said means impresses voltage across the respective impedance, but said motor is deenergized whenever both of said means are effective simultaneously to impress opposite voltages across said two impedances.

8. In combination, electric translating means, a source of operating voltage therefor, a pair of impedances serially connected between the terminals of said translating means, means for impressing voltage from said source across one of said impedances, said voltage being thereby impressed through the other of said impedances upon said translating means, and means for impressing the voltage from said source oppositely across the other of said impedances, whereby said translating means is energized whenever either of said last means is separately effective to impress voltage from said source on one of said impedances, but said translating means is deenergized whenever both of said last means are effective simultaneously to impress opposite voltages across said respective impedances.

9. In combination, an inductance device operable by alternating current of predetermined frequency, two condensers serially connected across said device, each of said condensers being resonant at said predetermined frequency with the inductance of said device, a source of alternating voltage of said predetermined frequency, means for impressing voltage from said source across one of said condensers, and means for impressing across said second condenser voltage from said source of opposite phase to that impressed across said first condenser, said two voltage impressing means being effective when separately operated to impress voltage across one of said condensers and to energize said device in series resonance with the other condenser, and being effective when simultaneously operated to deenergize said device.

10. In combination, an inductive device operable by alternating current of predetermined frequency, two condensers serially connected across said device, each of said condensers being resonant at said predetermined frequency with the inductance of said device, a source of alternating voltage of said predetermined frequency, means for impressing alternating voltage from said source across one of said condensers, means for impressing across said second condenser alternating voltage from said source of opposite phase to that impressed across said first condenser, said two voltage impressing means being effective when separately operated to impress voltage across one of said condensers and to energize said device in series resonance with the other condenser, and effective when simultaneously operated to deenergize said device, and means for protecting said voltage impressing means from the discharge current of said condensers which flows through said means when both said means are operated.

11. In combination, an inductive device operable by alternating current of predetermined frequency, two condensers serially connected across said device, each of said condensers being resonant at said predetermined frequency with the inductance of said device, a source of alternating voltage of said predetermined frequency, carrier current responsive relay means for impressing voltage from said source across one of said condensers, said means comprising a low current capacity switch, means for impressing across said second condenser voltage from said source of opposite phase to that impressed across said first condenser, said two voltage impressing means being effective when separately operated to impress voltage across one of said condensers and to energize said device in series resonance with the other condenser and being effective when simultaneously operated to deenergize said device, and means comprising a resistance in series with said switch for protecting said switch against the discharge current of said condensers which flows upon operation of said first voltage impressing means while voltage is impressed across said second condenser.

12. In a carrier current control receiver, the combination of a driving member, a driven member arranged to produce a control operation upon motion thereof, means for engaging said members in response to the reception of carrier current, said engaging means being maintained operative during motion of said members by the driving force transmitted therebetween, means independent of said driving member for advancing said driven member with respect to said driving member after completion of said control operation, said engaging means being so positioned that upon such advance of said driven member and cessation of the driving force between said members gravity its effective to cause disengagement of said members.

13. In a carrier current control receiver, the combination of a driving member, a driven member arranged to produce a control operation upon motion thereof, means responsive to the reception of carrier current to cause engagement between said members maintained by driving force transmitted therebetween, means for advancing said driven member with respect to said driving member after the completion of said control operation to remove said driving force and to release said engaging means, said last means comprising spring means sliding upon an inclined surface of said driven member.

14. In a carrier current control receiver, the combination of a driving member, a driven member arranged to produce a control operation upon motion thereof, means comprising a piece of magnetic material for causing engagement between said members in response to the reception of carrier current, said engagement being maintained by driving force transmitted between said members, means for advancing said driven member with respect to said driving member after completion of said control operation, and means effective when the driving force between said members disappears upon such advance to attract said magnetic material and disengage said members.

15. In a carrier current control receiver, the combination of a driving member, a driven member arranged to produce a control operation upon motion thereof, means for causing engagement of said members in response to the reception of carrier current, said engagement being maintained by driving force transmitted between said members, force exerting means acting to cause disengagement of said members after completion of said control operation, and means to cause said driven member to advance with respect to said driving member after said control operation is completed whereby said force exerting means is effective to cause such disengagement.

JOHN L. WOODWORTH.